June 17, 1930. L. D. SOUBIER 1,764,360
GLASS BLOWING MACHINE
Filed Oct. 2, 1922 2 Sheets-Sheet 1

INVENTOR
Leonard D. Soubier
By J. F. Rule,
His attorney.

June 17, 1930.    L. D. SOUBIER    1,764,360
GLASS BLOWING MACHINE
Filed Oct. 2, 1922    2 Sheets-Sheet 2

INVENTOR
Leonard D. Soubier
By J. F. Rule,
His attorney.

Patented June 17, 1930

1,764,360

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS-BLOWING MACHINE

Application filed October 2, 1922. Serial No. 591,750.

My invention relates to automatic glass blowing machines adapted for the manufacture of bottles and other hollow glassware.

An object of the invention is to provide improved means for eliminating from the finished ware, the usual scar or chill mark incident to the severing of the charge of glass in the mold. A further object of the invention is to provide an even and proper distribution of the glass as it is blown in the mold, thereby avoiding thin shoulders and other defects due to an imperfect distribution of the glass as it is blown.

Other objects of the invention will appear hereinafter.

Figure 3:
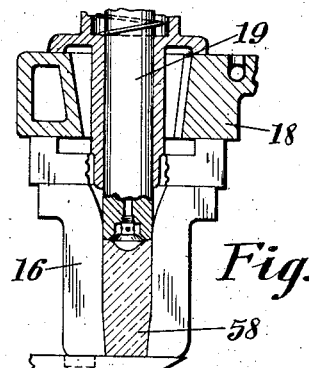
Figure 4:
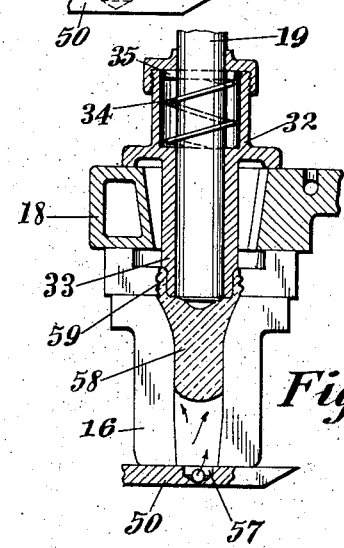
Figure 5:
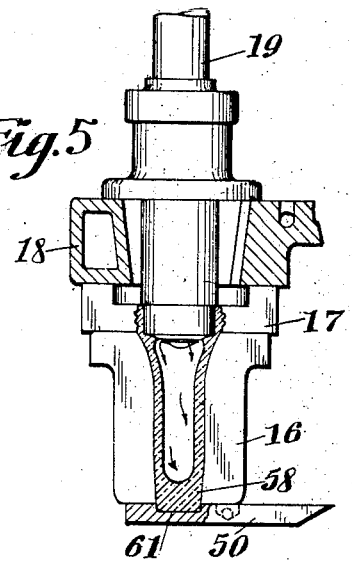
Figure 6:
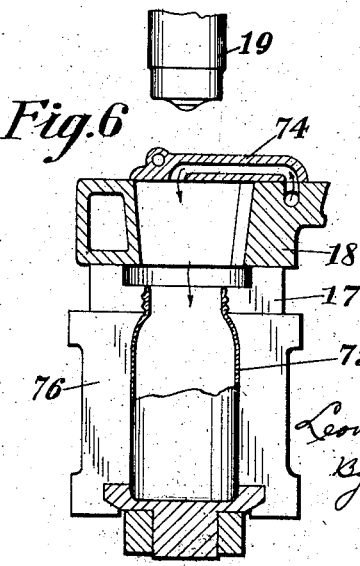

Figures 3 to 6 illustrate successive steps in the formation of a glass jar or bottle. Figure 3 shows the blank mold, plunger and knife immediately after the charge has been drawn into the mold and severed. Figure 4 shows the plunger partially withdrawn and a charge of glass drawn up therewith to form the neck of the article. Figure 5 shows the glass blown in the blank mold. Figure 6 shows the glass blown to its final form in the finishing mold.

Figure 7:
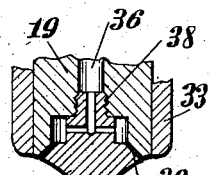

Figure 7 is a detail sectional view of the lower end of the plunger.

The invention is herein shown in connection with an automatic machine of the Owens type in which the blank molds, carried on a continuously rotating carriage, are successively brought into contact with a pool of molten glass and receive their charge by suction.

The mold carriage 10 is driven by power supplied through a shaft 11, pinion 12 and annular gear 13 on the mold carriage, the latter being mounted to rotate continuously about a stationary central column 14. Supported on the carriage are dipping heads or frames 15 each carrying a blank mold 16, a neck mold 17, a blowing head 18, plunger 19 and mechanism for operating said parts. As the carriage rotates, the blank molds 16 are successively brought over a tank 9 of molten glass. As a blank mold reaches such position, the head 15 is lowered to bring the lower open end of the mold in contact with the glass and suction is applied through the vacuum pipe 8, blowing head and neck mold to draw a charge of glass into the blank mold.

Figure 1:
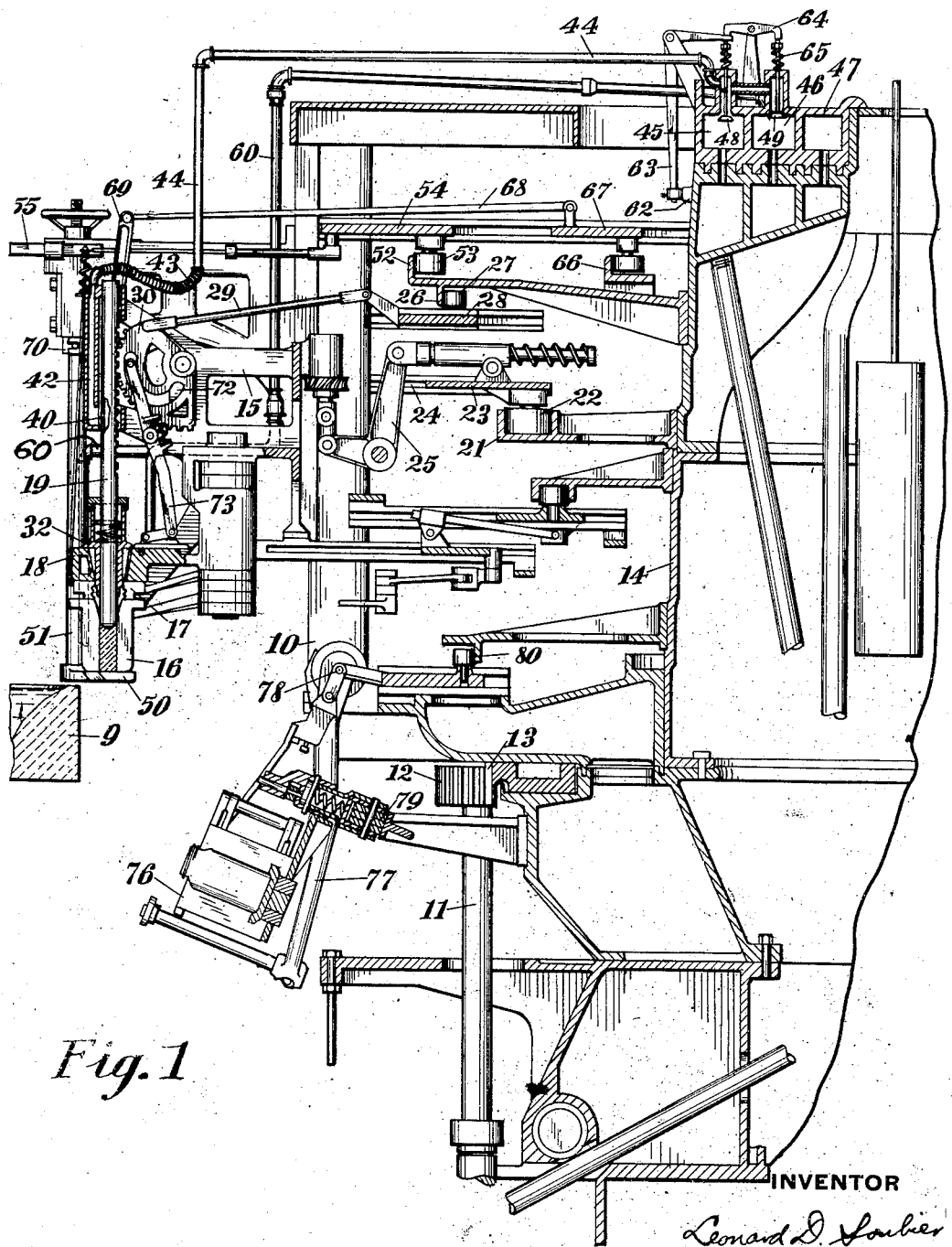
Figure 1 is a sectional elevation of part of a glass blowing machine to which the present invention is applied.
Figure 2:
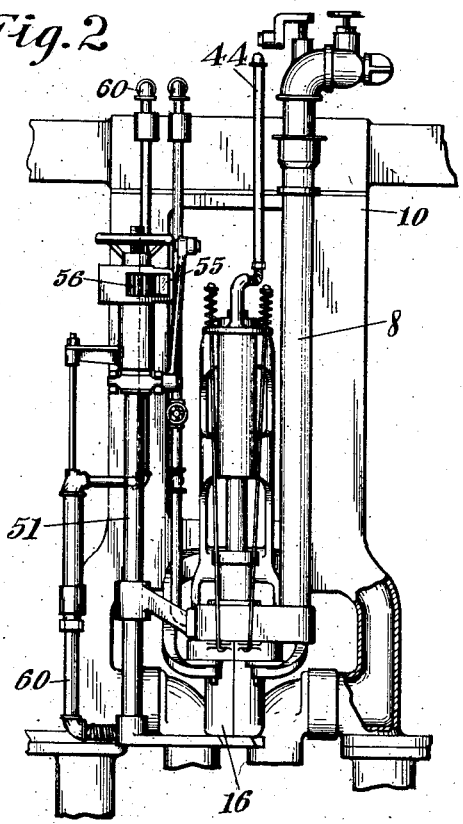
Figure 2 is a front elevation of a portion of the mechanism shown in Figure 1.

The lifting and lowering of the head 15 are controlled by a stationary cam 21 on which runs a roll 22 carried by a slide block 23 slidable radially of the machine in guides 24, said slide block being connected through a bell crank 25 to the frame 15. During the charging of the blank mold, the plunger 19 is in its lowermost position (Figs. 1 and 3). The up and down movements of the plunger are effected by means of a cam 26 on which runs a roll 27 carried by a slide block 28 connected through a link 29 to a gear segment 30 in mesh with rack teeth formed on the plunger 19.

Mounted on the lower end of the plunger rod for limited sliding movement lengthwise of the rod is a head 32 having a sleeve extension 33 which in its lowermost position terminates substantially flush with the lower end of the rod. The head 32 is yieldingly held in its lowered position by a coil spring 34. The upper end of the spring bears against a pin 35 extending through the rod 19, said pin also serving as a stop to limit the downward movement of the head on said rod. As the plunger is being lowered the head 32 comes into contact with the blowing head 18, thereby arresting its downward movement while the plunger continues to move downward to the position shown in Figures 1 and 3, in which the plunger projects a substantial distance within the blank mold.

When the blank mold is in position for gathering its charge from the tank 9, the plunger is in its lowered position (Fig. 3). Suction is now applied for drawing a charge of glass into the mold. This suction may be applied through the plunger which is provided with a passageway 36 therethrough (Fig. 7) connected to a source of partial vacuum. A removable tip 37 has a screw threaded connection 38 with the plunger rod. A narrow annular space or air passage 39 is provided between the plunger tip and the plunger, said space communicating with the opening 36. A port 40 (Fig. 1) provides communication from the interior of the plunger rod to a passage 42 leading to a flexible pipe 43 and pipe line 44 leading to a vacuum chamber 45 and air chamber 46 in a distributing head 47. The pipe line 44 is connected to the vacuum chamber through a valve 48 which is open during the charging of the mold. At the same time the air supply is cut off from the line 44 by a closed valve 49.

After the blank mold has received its charge of glass, the head 15 is lifted to withdraw the mold from the glass. The glass is then severed by a knife 50 carried on a vertical rock shaft 51. The latter is rocked by means of stationary cam 52 operating through a roll 53 and slide block 54 connected to a rack 55 in mesh with a pinion 56 on the shaft 51.

After the glass has been severed, the blade 50 is advanced to the Figure 4 position in which an air pressure port 57 is over the opening in the bottom of the mold. The plunger rod is also withdrawn to the Figure 4 position, the head 32 at this time remaining seated on the blowing head 18. During this upward movement of the plunger rod, suction is applied through the head 18 at the extreme upper end of the annular space forming the finish cavity, and may also be maintained through the plunger rod at a point spaced radially inward from said upper end of the cavity and at the lower end of the cavity wall, so that the charge of glass 58 is drawn upward, following the plunger and entering the annular space between the neck mold and the sleeve 33 which forms a neck shaping member, to thereby form the neck 59 of the bottle, jar or other article which is being produced. At the same time, air under pressure is supplied through the knife arm 50, thereby assisting in forcing the glass upward in the mold, compacting it therein and forming the neck. The air passage through the knife arm 50 is continued through a pipe 60 which leads to the pressure chamber 46.

After the operation just described, the knife 50 is advanced to the Fig. 5 position in which a recess 61 in the knife blade is in register with the mold cavity. The valve 48 is now closed and the valve 49 opened, thereby supplying air pressure through the pipe line 44 and through the hollow plunger rod to blow the glass to hollow form in the blank mold, as shown in Figure 5. The glass also enters the cavity 61, which is designed to reduce or eliminate any scar or shear mark that might otherwise appear on the bottom of the finished ware. The valves 48 and 49 are controlled by a cam 62 operating through a bell crank 63. When the bell crank is moved to position to close the valve 48, it operates through a lever 64 to open the valve 49. The latter is closed by a spring 65 when the valve 48 is opened.

After the parison has been formed as shown in Fig. 5, the knife is lowered vertically to clear the glass and then swung from beneath the mold. The up and down movements of the knife are controlled by a cam 66 operating through a slide block 67, link 68 and bell crank 69, the latter having a connection at 70 with the knife shaft 51. The plunger is also entirely withdrawn after the parison has been blown in the blank mold, the blank mold is opened and the finishing mold 76 swung up and encloses the parison. As the segment 30 rotates to withdraw the plunger, a cam 72 therein operates through a lever 73 to move a slide valve 74 over the blowing head (Fig. 6). Air pressure is now supplied through said head to blow the glass jar or other article 75 to its final form. The finishing mold may be carried, as is usual in Owens machines, on a frame 77 which swings about an axis 78, said frame being supported on a cam track 79. The opening and closing movements of the finishing mold are controlled by a cam 80.

Modifications may be resorted to within the spirit and scope of my invention.

What I claim is:

1. In a glass forming machine, the combination of a blank mold, a neck mold, a shaping member cooperating with the neck mold to provide a neck cavity in which the neck of the glass article is formed, means to charge the mold by suction, a plunger projecting into the neck mold and movable lengthwise through the neck mold and said shaping member while the latter is in neck forming position, and means to withdraw the plunger and said shaping member after the neck portion of the article has been shaped.

2. In a glass forming machine, the combination of a blank mold, a plunger, a neck shaping member carried with the plunger, means to project the plunger into the mold while the shaping member is stationary relative to the mold and thereby reduce the effective capacity of the mold, means to charge the mold while the plunger is projected, and means to withdraw the plunger and shaping member.

3. The combination of a blank mold, a neck mold, a sleeve projecting into the neck mold and forming therewith a neck cavity, a plunger projecting through said sleeve, means to move said plunger into and out of the blank mold and reciprocate the plunger within said sleeve, means to cause the said sleeve to be withdrawn with the plunger, and means to introduce a charge of glass into the blank mold while the sleeve is in said position in the neck mold.

4. The combination of a blank mold, a neck mold, a sleeve projecting into the neck mold and forming therewith a neck cavity, a plunger projecting through said sleeve into the blank mold, said plunger forming a closure for the blank mold cavity, means to introduce a charge of glass into the mold while the plunger is in said position, means to withdraw the plunger to an intermediate position, means to force a portion of the glass into the neck mold cavity to form the neck while the plunger is in said intermediate position, means to then withdraw the plunger and said sleeve, and means to blow the glass.

5. In a glass forming machine, the combination of a blank mold, a neck mold, a plunger, means to project the plunger downward within the blank mold, means to charge the mold beneath the plunger by suction, the lower end of the plunger being substantially the same diameter as the mold cavity, whereby the glass entering the mold is prevented from passing upward past the plunger, means to withdraw the plunger, means to cause the glass to follow upward with the plunger, a neck mold, a shaping member surrounding the plunger and forming with the neck mold a neck cavity in which the glass is molded to form the neck of the article, and means to withdraw the plunger and said shaping member from the neck mold.

6. In a glass forming machine, the combination of a blank mold, a neck mold separate from the blank mold and in register therewith, a plunger extending through the neck mold, a hollow forming member surrounding the plunger and shaped to form with the neck mold a neck cavity, means to move the plunger lengthwise within the blank mold and forming member to vary the capacity of the blank mold, the blank mold being open at the end opposite the neck mold to receive a charge of glass, and means to introduce a charge of glass into the blank mold through said open end while the plunger and hollow forming member are in the mold and shape the glass in said neck cavity.

7. In a glass forming machine, the combination of a blank mold, a neck mold in register therewith, a plunger, a hollow forming member surrounding the plunger and shaped to form with the neck mold a neck cavity, means to introduce and measure a charge of glass in the blank mold and shape it in said neck cavity, said plunger having an air passage therethrough, means to shift the plunger and thereby increase the capacity of the blank mold and means for then supplying air under pressure through the plunger and blowing the glass to hollow form in the blank mold.

8. In a glass forming machine, the combination of a blank mold, a neck mold in register therewith, a plunger, a hollow forming member surrounding the plunger and shaped to form with the neck mold a neck cavity, means to introduce a charge of glass into the blank mold and shape it in said neck cavity, said plunger having an air passage therethrough, and means for supplying air under pressure through the plunger and blowing the glass to hollow form in the blank mold, means to withdraw said forming member, plunger and blank mold, leaving the glass suspended from the neck mold, a finishing mold, and means to blow the glass therein.

9. In a glass forming machine, the combination of a mold open at its lower end to receive a charge of glass, means to dip said end in a pool of molten glass, means to gather the glass by suction in the mold, a plunger projecting downward into the mold, a cutter to sever the glass, means to draw the plunger upward, means to cause the charge of glass to move upward with the plunger, a sleeve surrounding the plunger and forming with the mold a neck mold cavity into which the glass enters during said upward movement of the plunger, and means to blow the glass to hollow form in the mold.

10. In a glass forming machine, the combination of a mold, a sectional plunger, means to project the plunger into the mold, means to arrest one of the plunger sections before the second section has completed its movement into the mold, said second section forming with the mold a measuring cup, and means to introduce a charge of glass into said cup while said second section is fully projected in the mold.

11. In a glass forming machine, the combination of a mold, a plunger comprising telescoping sections, means to actuate the plunger and cause both sections to enter the mold, means to arrest one section before the other section has completed its said movement, and means to introduce a charge of glass into the mold after said movement has been completed and before the plunger is withdrawn.

12. In a glass forming machine, the combination of a mold, a plunger comprising a neck forming section and an inner section, means to project the plunger into the mold, a stop to arrest the neck forming section in neck forming position while permitting a continued movement of the inner section, and means to introduce a charge of glass into the mold after said movement of the inner section has been completed and before the plunger is withdrawn.

13. In a glass forming machine, the combination of a blank mold, a neck mold in register therewith, the neck mold opening being of larger diameter than the blank mold cavity, a plunger comprising a core of about the diameter of the blank mold cavity and a neck forming sleeve, and means to project the plunger and cause said sleeve to enter the neck mold and form therewith a neck mold cavity, said core being movable through the sleeve to enter the blank mold cavity.

14. The method of forming parisons which consists in drawing a measured quantity of glass by suction into the open end of a mold, severing the glass and simultaneously closing the mold, continuing suction after closing of the mold, and substantially simultaneously cutting off suction and applying air pressure at the normally closed end of the mold to give shape to the parison.

15. In a machine for forming hollow glass articles, the combination of a mold comprising a body portion and a neck mold portion for forming the exterior surface of the neck portion of the article, a tubular member extending into said neck portion and shaped to form the interior neck surface of the article, a plunger extending through said tubular member into said body portion and having its diameter substantially equal to the diameter of the body mold cavity, means for bringing the opposite end of the mold in contact with a supply body of molten glass and charging the mold by suction, means for severing the glass, a closure plate, means for bringing the closure plate into position to close the charge receiving end of the mold, means for moving the plunger outwardly while said closure plate is in said position, and means cooperating with the plunger for causing the glass to move out of contact with the closure plate when the plunger is moved outwardly.

16. In a machine for molding glass articles, the combination of a blank mold open at its lower end, a neck mold above and in register with the blank mold, a tubular member projecting downward into the neck mold and shaped to mold the inner surface of the neck portion of the article, a plunger projecting downward through said tubular member into the blank mold, the outer diameter of the plunger being substantially equal to the blank mold cavity, means to introduce a charge of glass by suction through the lower end of the mold, means for severing the glass, a mold bottom plate movable into position to close said bottom end of the mold, means for moving the plunger upward a predetermined distance while said tubular member is in said molding position, and means cooperating with the plunger to cause the glass to move upward out of contact with said bottom plate when the plunger is moved upward.

Signed at Toledo, in the county of Lucas and State of Ohio, this 28th day of Sept., 1922.

LEONARD D. SOUBIER.